United States Patent Office 3,552,798
Patented Jan. 5, 1971

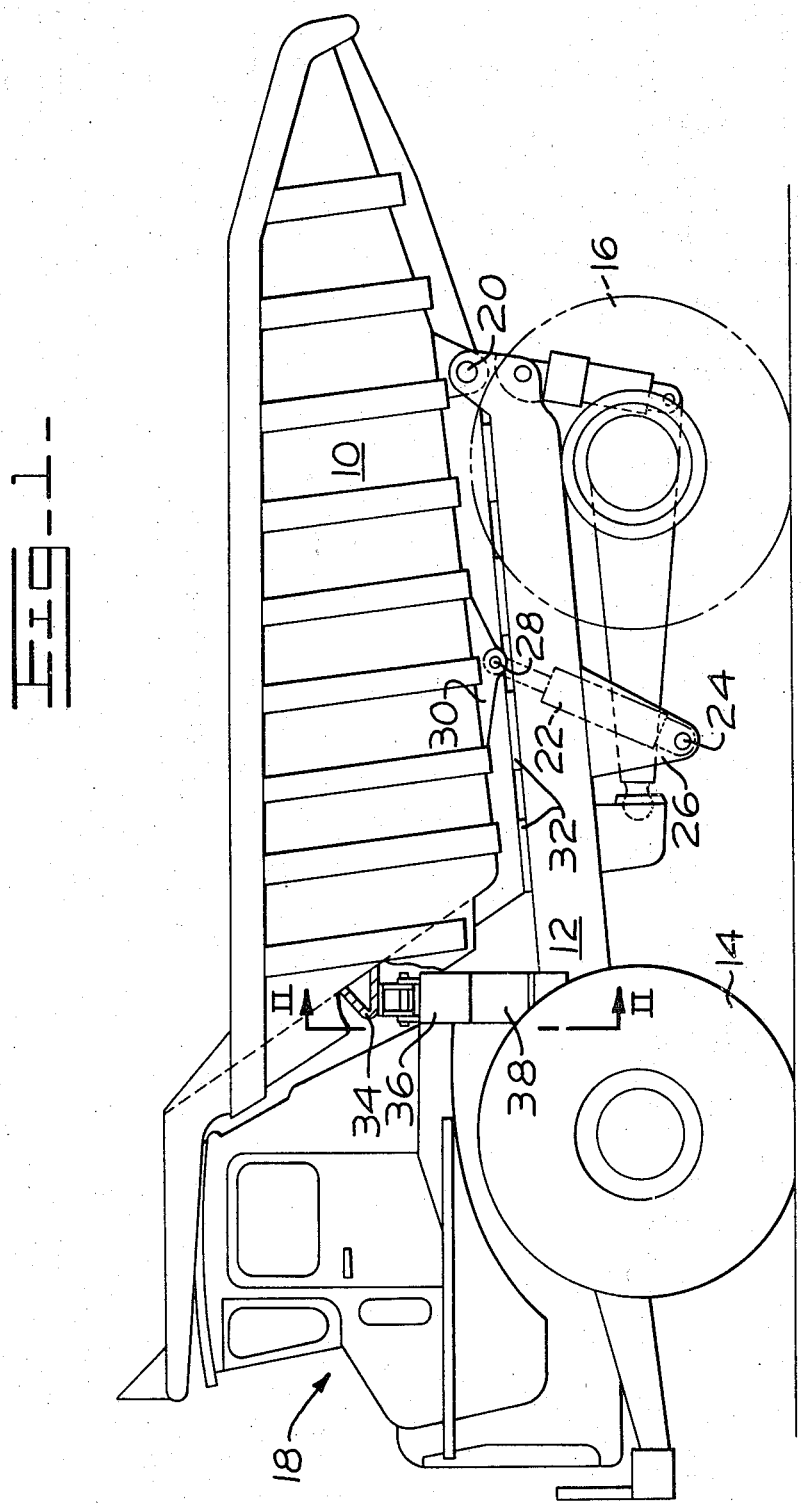

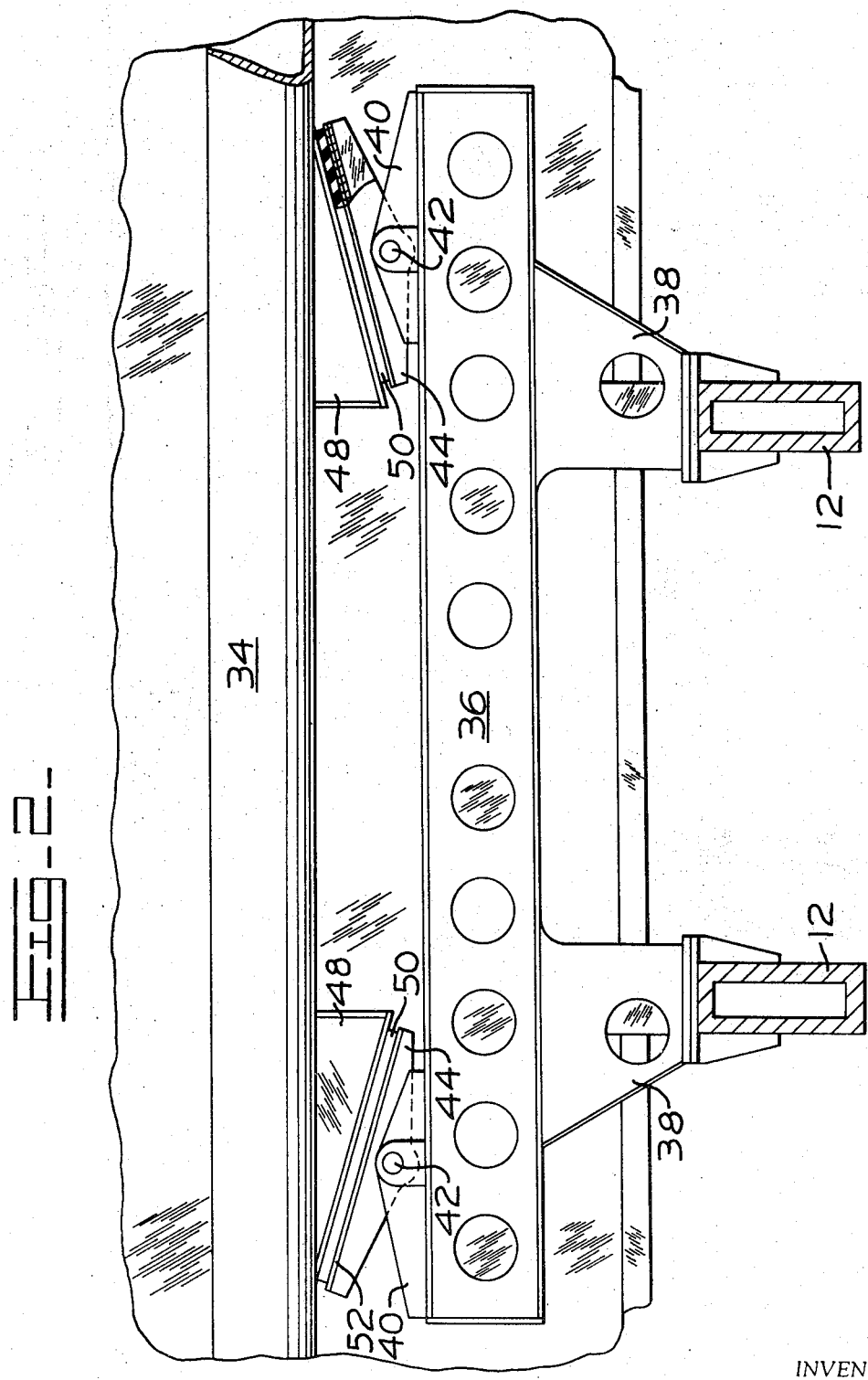

3,552,798
DUMP TRUCK BODY SUPPORTING MEANS
Carroll R. Cole and Alfred W. Sieving, Decatur, Ill., assignors to Caterpillar Tractor Co., Peoria, Ill., a corporation of California
Filed Feb. 3, 1969, Ser. No. 795,893
Int. Cl. B60p 1/04
U.S. Cl. 298—22                                                6 Claims

ABSTRACT OF THE DISCLOSURE

Means to support and cause centering of the forward portion of the body of a rear dump truck to enhance the distribution of weight on the truck frame and to reduce stresses at the hinge connection between the rear of the body and the frame.

---

In conventional rear dump trucks a dump body is pivotally connected to the truck frame adjacent the rear end of the body and power means, generally in the form of a hydraulic jack, is employed to raise the forward end of the body about the hinge or pivotal connection at the rear end to cause discharge of the contents of the body. Because fo the extremely heavy loads in modern off-highway trucks ranging in capacity, for example, from 35 tons to 100 tons, any tendency of the forward end of the truck body to move from side to side can be extremely damaging to the hinge connection adjacent the rearward end. It is, therefore, desirable to provide some means for insuring against sidewise motion of the forward end of the body particularly when it is in its carry position as distinguished from its dump position and it is also desirable to obtain an equal distribution of the load of the body and its contents throughout the truck frame. It is to the accomplishment of the ends recited above that the present invention is directed and an understanding of the invention in the manner in which it is carried into practice will be obtained upon reading the following specification wherein reference is made to the accompanying drawings.

In the drawings:

FIG. 1 is a view in side elevation of a truck embodying the present invention with parts broken away and parts shown in section to clearly disclose the inventive features; and FIG. 2 is a sectional fragmentary view looking rearwardly at the forward end of the truck body as from the line II—II of FIG. 1.

The truck shown in FIG. 1 is generally of conventional design having a body 10 supported on a frame 12 which is in turn supported by front wheels 14 and rear wheels 16. A cab and engine assembly also supported on the frame 12 is generally indicated at 18. The body is pivotally connected to the frame as at 20 by pivot pins adjacent its rear end and disposed adjacent its opposite sides. Dumping or raising of the forward end of the body to discharge its contents is accomplished by a jack shown at 22 disposed between a pivot point 24 on a bracket 26 which extends downwardly from the frame, and a pivot 28 on a bracket 30 which extends downwardly from the body. Extension of the jack through the medium of a hydraulic circuit and conventional controls raises the forward end of the body about the pivots 20 to discharge its contents.

The body is supported with respect to the frame by shock-absorbing or cushioning elements of rubber-like material shown at 32 and arranged at spaced intervals throughout the length of the frame and longitudinally extending reinforcing members beneath the bottom of the body. During raising and lowering of the body and during filling of the body when material is discharged from a bucket loader or the like into the body, stresses imposed in a transverse direction toward the forward end of the body cause a twisting action in the area of the rearwardly disposed pivots 20. This is destructive to the pivots and their surrouding structure and tends to cause misalignment of the body with respect to the frame. It is desirable, therefore, to cause the body to maintain a central position with respect to the frame when it is in its lowered or carry position as illustrated in FIG. 1. This is accomplished by mechanism of the present invention which also tends to transmit the load carried by the forward end of the body to the frame tending to equalize distribution of load throughout the frame.

To accomplish the objects of the present invention, supporting and centering means are provided adjacent the forward end of the body and are shown in FIGS. 1 and 2. A transverse reinforcing member is shown at 34 as welded to and extending across the forward end of the body and a support and reinforcing member is shown as a cross bar 36 in the form of a fabricated beam supported with respect to the frame members 12 by supporting brackets 38, preferably welded to the frame and member 36. Brackets 40 adjacent opposite ends of the cross member 36 contain bearings for pivot pins 42, each of which extends through a support plate or pad 44 capable of rocking movement about its pivot 42. Extending downwardly from the cross member 34 on the front of the truck body are triangularly shaped members 48 disposed for engagement with the top surfaces of the pads 44. Disposed between these members and preferably fixed with respect to the members 44 are flat, shock-absorbing cushions indicated at 50. Shims, one of which is shown at 52 beneath the member 44 at the lefthand side of FIG. 2, may be placed beneath the cushions to adjust for manufacturing tolerances and cause equal distribution of the body weight between the two pivoted pads 44.

Due to the angular disposition of the supporting surfaces with respect to the truck body and frame, the body is caused to assume a central position with respect to the frame. In this connection, the present disclosure shows the triangular members 48 as converging downwardly and inwardly toward the center of the frame but they could as well converge downwardly and outwardly and still cause centering of the body with respect to the frame.

Because the forward supporting pads are pivoted, their resilient cushion portions are allowed to remain in even contact when the frame twists during transport of a load over uneven terrain insuring uniform pressure or stress on the rubber-like cushions. The pivotal support also accommodates to misalignment and mislocation due to manufacturing tolerances or deformation of the body during use. Furthermore, location of the support means toward the front of the body transfers more of the load to the forward portion of the frame and the front wheels of the vehicle. This provides better distribution of load to the frame as well as to the vehicle tires.

What is claimed is:

1. In a rear dump truck having a frame member and a body member pivoted adjacent its rear end to the rearward part of the frame, a supporting and centering means between the forward portions of the body member and the frame member comprising two angularly disposed surfaces on one member, said surfaces being disposed at an angle with respect to the truck body and frame, and pivots supporting two pivoted surfaces for abutment with the angularly disposed surfaces on the other member, whereby the body member is caused to assume a central position with respect to the frame member.

2. The combination of claim 1 with a transverse brace member at the forward end of the body, and a beam extending transversely between spaced longitudinal frame members, said supporting and centering means being disposed between said brace and beam.

3. The supporting and centering means of claim 1 with resilient pad means between the abutting surfaces.

4. The combination of claim 2 with shim means behind said pad means.

5. In a rear dump truck having a frame member and a body member pivoted adjacent its rear end to the rearward part of the frame, a supporting and centering means between the forward portions of the body member and frame member comprising two angularly related surfaces on one member and two pivoted surfaces for abutment with the angularly related surfaces on the other member, and said angularly related surfaces extending transversely of the truck and converging toward the center of the truck.

6. In a rear dump truck having a frame member and a body member pivoted adjacent its rear end to the rearward part of the frame, a supporting and centering means between the forward portions of the body member and frame member comprising two angularly related surfaces on one member and two pivoted surfaces for abutment with the angularly related surfaces on the other member, and said angularly related surfaces extending transversely of the truck and diverging away from the center of the truck.

References Cited
UNITED STATES PATENTS

| | | | |
|---|---|---|---|
| 2,047,051 | 7/1936 | Armington | 298—17.6 |
| 2,490,532 | 12/1949 | Maxon | 296—28.22X |
| 2,623,602 | 12/1952 | Double | 298—22X |
| 3,212,818 | 10/1965 | Malmgren | 298—17X |
| 2,332,991 | 10/1943 | Commire | 280—414UX |

RICHARD J. JOHNSON, Primary Examiner